US009137690B2

(12) United States Patent
Janakiraman

(10) Patent No.: US 9,137,690 B2
(45) Date of Patent: Sep. 15, 2015

(54) MULTIPLE PROTOCOL SESSION RECORD MAPPER

(71) Applicant: Tektronix, Inc., Beaverton, OR (US)

(72) Inventor: Vignesh Janakiraman, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 99 days.

(21) Appl. No.: 13/622,062

(22) Filed: Sep. 18, 2012

(65) Prior Publication Data

US 2014/0080447 A1    Mar. 20, 2014

(51) Int. Cl.
*H04L 9/32*     (2006.01)
*H04W 24/08*    (2009.01)

(52) U.S. Cl.
CPC ................... *H04W 24/08* (2013.01)

(58) Field of Classification Search
USPC ............. 455/411, 412.1, 414.1, 432.1–432.2, 455/435.1–435.2, 436, 448, 466
See application file for complete search history.

(56) References Cited

U.S. PATENT DOCUMENTS

| | | | | |
|---|---|---|---|---|
| 8,195,778 | B1* | 6/2012 | Leung et al. | 709/222 |
| 8,219,693 | B1* | 7/2012 | Deflaux et al. | 709/228 |
| 2007/0156842 | A1* | 7/2007 | Vermeulen et al. | 709/217 |
| 2007/0197212 | A1 | 8/2007 | Marsico et al. | |
| 2009/0176513 | A1 | 7/2009 | Bosch et al. | |
| 2009/0293045 | A1* | 11/2009 | Cheriton | 717/136 |
| 2010/0227591 | A1* | 9/2010 | Park et al. | 455/411 |
| 2011/0123028 | A1* | 5/2011 | Karabinis | 380/270 |
| 2011/0143753 | A1 | 6/2011 | Rahman et al. | |
| 2011/0164589 | A1* | 7/2011 | Lee et al. | 370/331 |
| 2011/0188397 | A1 | 8/2011 | McCann et al. | |
| 2012/0071146 | A1* | 3/2012 | Shrivastava et al. | 455/414.3 |
| 2012/0155428 | A1 | 6/2012 | Bovo et al. | |
| 2012/0157000 | A1* | 6/2012 | Marklund et al. | 455/67.11 |
| 2012/0163571 | A1* | 6/2012 | Brunson et al. | 379/93.02 |
| 2012/0204032 | A1* | 8/2012 | Wilkins et al. | 713/170 |
| 2013/0157661 | A1* | 6/2013 | Bhaskaran et al. | 455/436 |
| 2013/0163442 | A1* | 6/2013 | Livingston | 370/252 |

OTHER PUBLICATIONS

European Search Report issued Mar. 19, 2014 in corresponding European Patent Application EP 13 18 4898.

* cited by examiner

*Primary Examiner* — Anthony Addy
*Assistant Examiner* — Matthew Genack
(74) *Attorney, Agent, or Firm* — Locke Lord LLP; Scott D. Wofsy; Christopher J. Capelli

(57) ABSTRACT

A mapper for use in processing messages captured from a telecommunications network is disclosed. In one embodiment, one or more LTE messages are received from a LTE network, and one or more CDMA messages are received from a CDMA network. An LTE/CDMA mapper entry associated with the LTE and CDMA messages is identified. The LTE/CDMA mapper is associated with UE that is capable of operating on both the LTE and CDMA networks. The LTE and CDMA messages are processed using the LTE/CDMA mapper. The processing of the LTE and CDMA messages may comprise extracting parameters from the LTE or CDMA messages and storing the parameters to the LTE/CDMA mapper. The content in the LTE or CDMA messages may be deciphered using authentication parameters stored in the LTE/CDMA mapper. A generic client library may be used, for example, to access the LTE/CDMA mapper.

13 Claims, 4 Drawing Sheets

MULTIPLE PROTOCOL SESSION RECORD MAPPER

BACKGROUND

Wireless networks have evolved over the past decade to provide extensive mobile data and mobile Internet services. Subscribers routinely use their mobile devices to access streaming audio and video, read and send electronic mail, and browse the Internet. To support the increasing use of data and multimedia services, service providers must continually evolve their networks. As mobile data continues to expand, many service providers are moving toward next generation networks, such as Long Term Evolution (LTE) networks. LTE is a 3GPP mobile specification that is designed to provide multi-megabit data rates, efficient radio networks, reduced latency, and improved mobility.

Traditionally, mobile networks have primarily followed two standards-based technologies—(1) GSM EDGE Radio Access Network (GERAN)/Universal Terrestrial Radio Access Network (UMTS) and (2) Code Division Multiple Access (CDMA). The GERAN/UMTS-based networks provide a natural evolution to LTE. Many CDMA-based network operators have also decided to evolve toward the LTE specification. Those CDMA operators have evolved their networks to support "evolved High Rate Packet Data" (eHRPD) as a step on the migration path toward LTE. eHRPD allows mobile operators to upgrade existing HRPD packet core networks and integrating them with elements of the Evolved Packet Core (EPC) architecture. eHRPD allows for seamless service mobility and handoffs between the eHRPD and LTE networks.

CDMA operators are undergoing a phased migration in which existing HRPD networks evolve to eHRPD on the way to becoming LTE networks. To introduce eHRPD, a HRPD Serving Gateway (HSGW) is added to the CDMA network. The HSGW allows the inter-working between eHRPD and EPC and ensures mobility between eHRPD and LTE networks so that subscribers experience seamless handover between CDMA and LTE networks without dropping sessions and with reduced latency.

In a complex system, such as connected or overlapping CDMA/LTE networks, the tasks of measuring network performance, troubleshooting network operation, and controlling network service behavior can be very difficult for the network operator. Evolution of the network, such as the introduction and deployment of new network technology, causes additional instability and further problems in network measurement, troubleshooting and control. In order to perform these tasks, network operators often make use of external monitoring systems. These monitoring systems are typically connected to the network in a non-intrusive mode that allows them to sniff data from the network interfaces, processing the data and provide measurements and reports that help the network operator to manage its network. The monitoring system typically needs to track the subscribers' user equipment (UE) activities in order to provide detailed analysis of the services used by the subscribers and to collect information about the network's behavior for troubleshooting and optimization purposes.

SUMMARY

The proposed invention deals with a scheme to map several key parameters of a UE on a LTE/CDMA network to a data model, persist the data model on a database, and share the data model with any number of clients or applications. In one embodiment, the database may be a generic key value database.

In one embodiment, one or more LTE messages are received from a LTE network, and one or more CDMA messages are received from a CDMA network. An LTE/CDMA mapper entry associated with the LTE and CDMA messages is identified. The LTE/CDMA mapper is associated with UE that is capable of operating on both the LTE and CDMA networks. The LTE and CDMA messages are processed using the LTE/CDMA mapper. The processing of the LTE and CDMA messages may comprise extracting parameters from the LTE or CDMA messages and storing the parameters to the LTE/CDMA mapper. The content in the LTE or CDMA messages may be deciphered using authentication parameters stored in the LTE/CDMA mapper. A generic client library may be used, for example, to access the LTE/CDMA mapper.

In one embodiment, if no LTE/CDMA mapping information is available in a local cache, then the information is retrieved from a central database.

The LTE/CDMA mapper may be a generic database providing a key-value store. Data may be stored to the generic database by serializing a data value and indexing with a key and sending the key-value pair to the LTE/CDMA mapper.

The LTE messages may be received at a first monitoring probe coupled to the LTE network, and the CDMA messages may be received at a second monitoring probe coupled to the CDMA network. The parameters may be stored to the LTE/CDMA mapper from both the first and second monitoring probe.

BRIEF DESCRIPTION OF THE DRAWINGS

Figure 1:
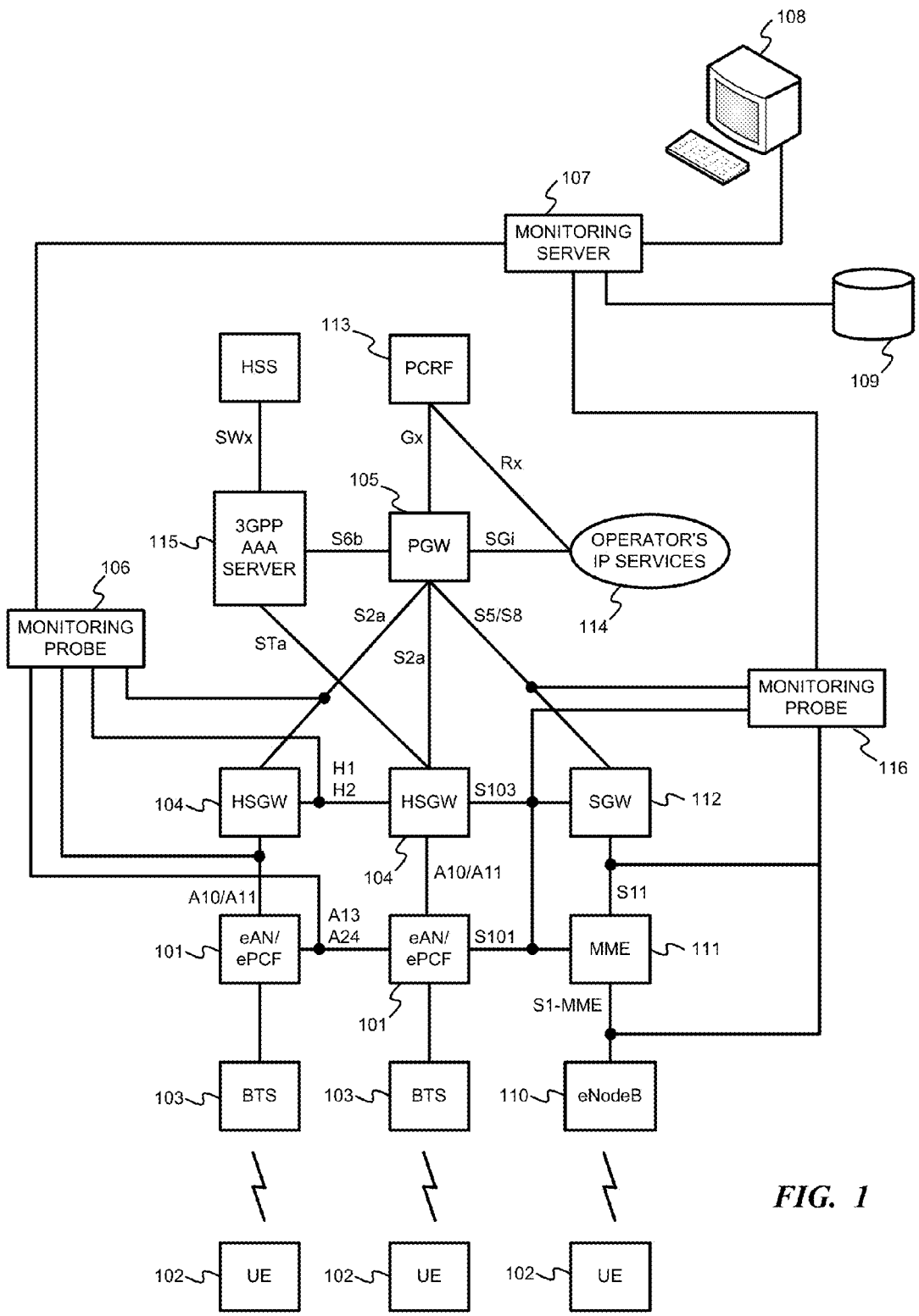

Having thus described the invention in general terms, reference will now be made to the accompanying drawings, wherein:

FIG. 1 is a block diagram of an integrated eHRPD/LTE network that includes eHRPD elements of an evolved CDMA network and LTE nodes.

Figure 2:
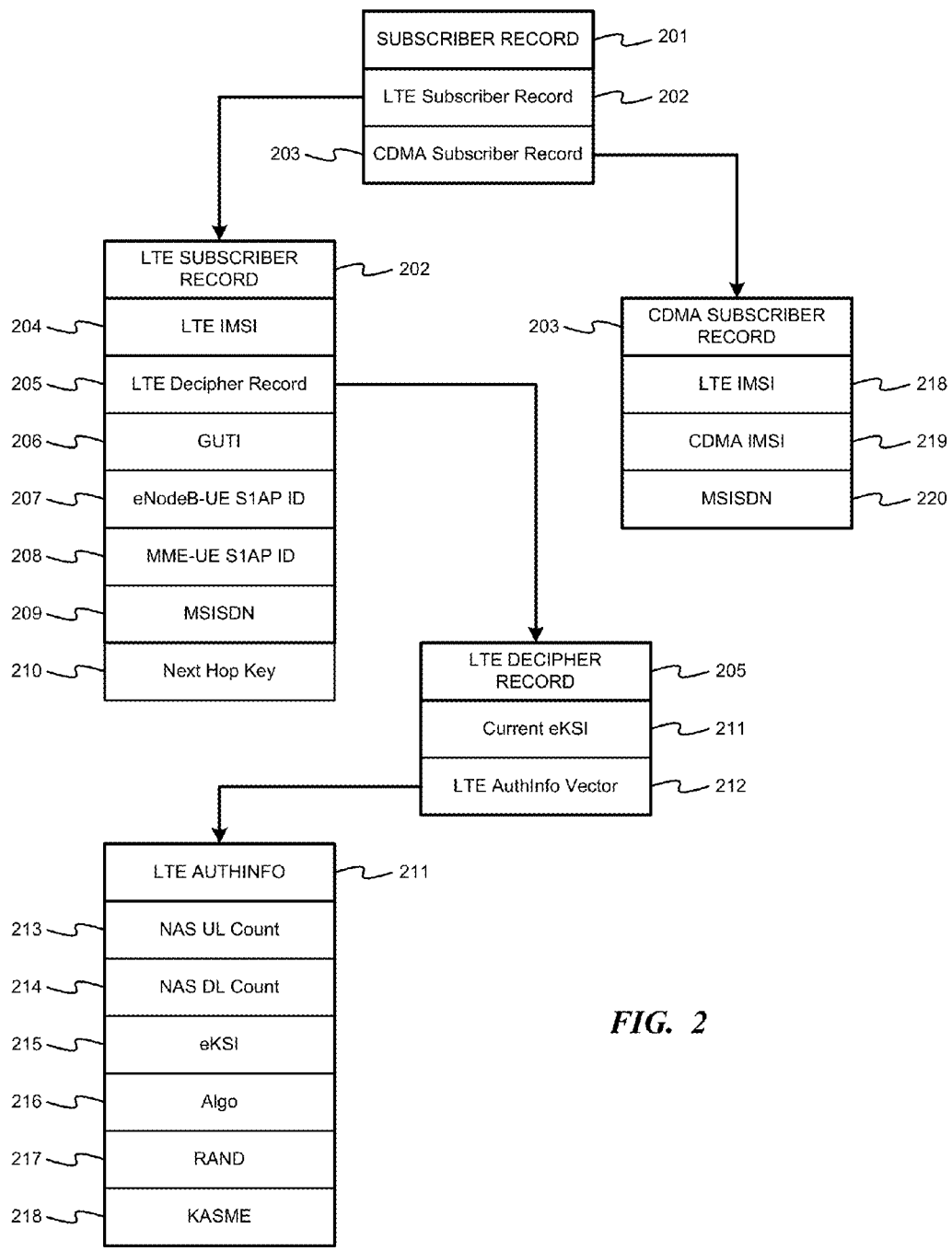

FIG. 2 illustrates a data model for a CDMA/LTE mapper according to one embodiment.

Figure 3:
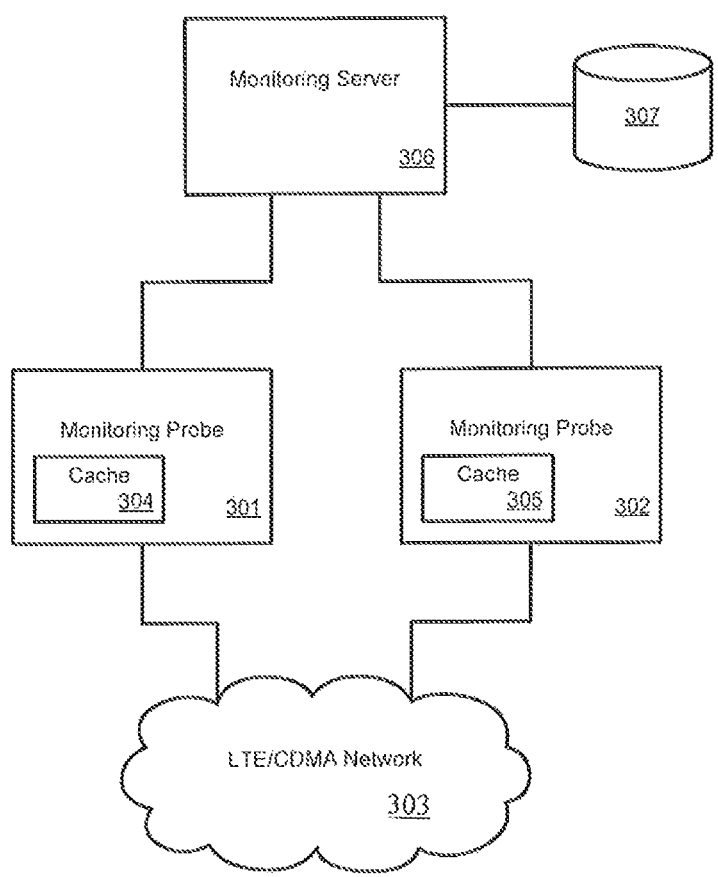

FIG. 3 illustrates the use of the mapper in one embodiment in which monitoring probes capture packets from various interfaces and/or from nodes in CDMA/LTE networks.

Figure 4:
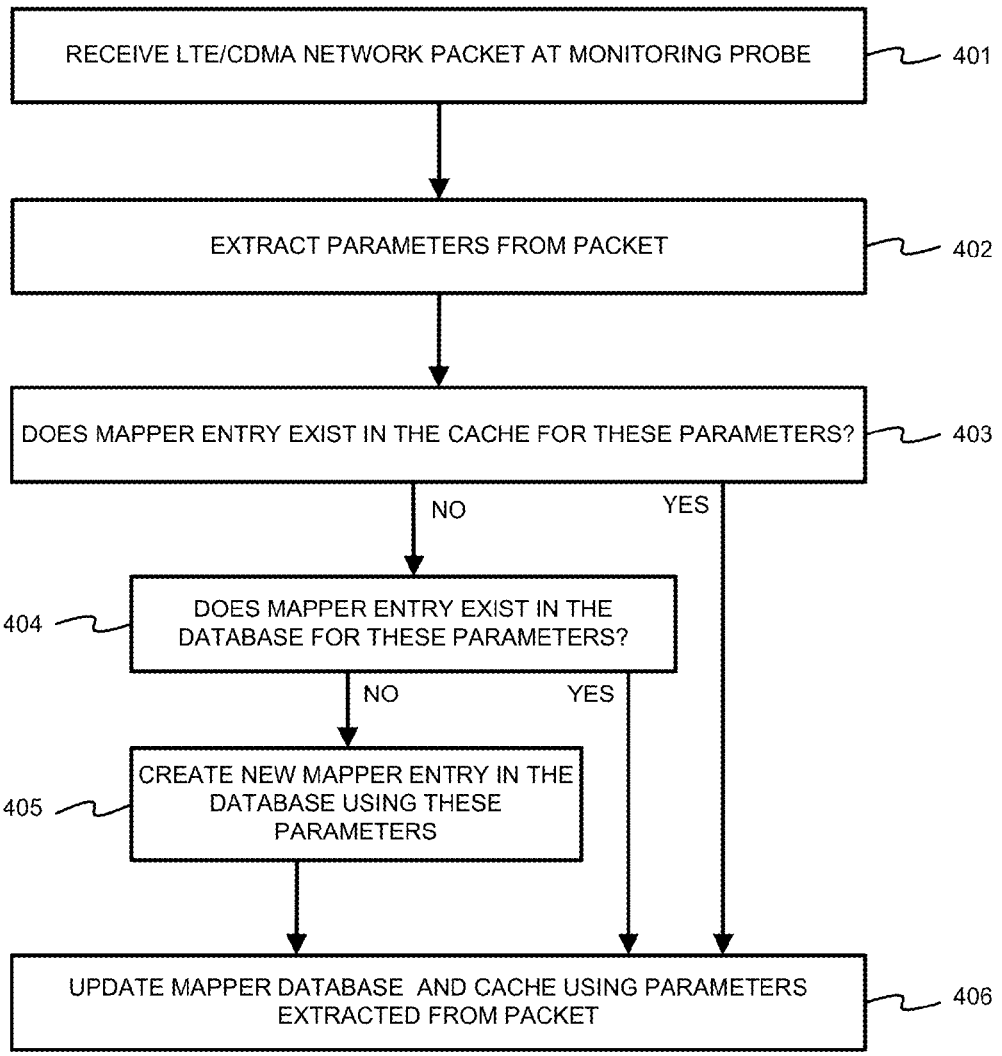

FIG. 4 is a flowchart illustrating the use of the mapper according to one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram of an integrated eHRPD/LTE network that includes eHRPD elements of an evolved CDMA network and LTE nodes. The eHRPD network includes many evolved Packet Control Function (ePCF) nodes 101. The ePCFs are interfaced with an evolved Access Network (eAN), which provides User Equipment (UE) 102 access to the eHRPD network. The eAN and the ePCF can be physically combined into the same node 101 as illustrated in FIG. 1. Different eAN/ePCF nodes 101 communicate with each other via the A13 and A24 interfaces. The ePCFs 101 in the eHRPD network are coupled to one or more Base Transceiver Station (BTS) or cell sites 103 that provide the air interface connection to the subscribers' UE 102.

Each of the eAN/ePCF nodes 101 are connected to an HRPD Serving Gateway (HSGW) 104. A single HSGW 104 serves multiple eAN/ePCF nodes 101 via the A10/A11 interfaces. The HSGW nodes 104 communicate with each other via the H1/H2 interfaces. The HSGWs 104 are coupled to a Packet Data Network (PDN) Gateway (PGW) 105 via S2a interfaces.

In one embodiment, the network operator uses a monitoring system that is independent from the eHRPD network to control the network and to monitor its current network status and activity. The monitoring system may include one or more monitoring probes 106 that are coupled to one or more network interfaces. The monitoring probes passively capture messages, data packets, or protocol data units (PDU) from the interfaces without interfering with the operation of the eHRPD network. The monitoring probes 106 process the captured data immediately and/or pass the data to a central monitoring server 107. The captured data may be correlated and processed in monitoring server 107 and information regarding the current status of the network extracted from the data. A network operator may access this information using workstation 108. Captured data may be stored by the monitoring system in database 109.

As CDMA/eHRPD service providers expand their networks, LTE nodes are added to the network to provide 4G services. The LTE nodes may be interconnected with the eHRPD nodes, thereby avoiding the problem of having a separate or overlaid LTE network. In FIG. 1, LTE/SAE nodes have been coupled to the eHRPD nodes to integrate 4G network architecture.

The enhanced NodeB (eNodeB or eNb) 110, like BTS 103, provides the air interface connection to the subscribers' UEs 102. eNodeB 110 manages the radio path to the UE and hosts the physical radio establishment, radio link control, and medium access control functions. eNodeB 110 also encrypts and decrypts data toward the radio path and handles the radio resource admission and management.

MME 111 is responsible for managing the Non Access Stratum (NAS) control plane messages from/to the UE 102. In addition, MME 111 plays a role in selecting Serving Gateway (SGW) 112 for user plane traffic, coordinates handover in the LTE network, and establishes the necessary authentication and security procedures. SGW 112 is the endpoint of user plane connections from multiple eNodeBs. SGW 112 is an anchor for user plane connections in case of UE handover between different eNodeBs. To support and optimize handover of UEs 102 between eHRPD and LTE network elements, additional interfaces are added to the network. Interface S103 connects HSGW 104 and SGW 112, and interface S101 connects eAN/ePCF 101 and MME 111.

PGW 105 is the converging point between the eHRPD and LTE networks. PGW 105 also provides an interface between the Evolved Packet Core (EPC) and external PDN networks such as the Internet (not shown). PGW 105 also provides an interface to Policy and Charging Rules Function (PCRF) node 113. PCRF 113 supports the creation of network and subscriber policy rules and automatically makes policy decisions for each subscriber active on the network, such as availability of services, quality of service (QoS) levels, and charging rules. PGW 105 further provides access to other services, such as the network operator's services 114, and the 3GPP Authentication, Authorization and Accounting (AAA) Server 115.

In addition to monitoring probes 106, which monitor the eHRPD network interfaces, one or more monitoring probes 116 may be used to monitor the interfaces in the LTE network and the interfaces interconnecting the eHRPD and LTE networks. Monitoring probe 116 operates in the same way as probe 106 and is also coupled to central monitoring server 107. Although separate eHRPD and LTE monitors (106, 116) are shown in FIG. 1, it will be understood that the monitors may capture data packets from both eHRPD and LTE network nodes in other embodiments.

A session, call, or data record is created for each UE 102 using messages, signals, and/or data collected or intercepted by monitoring probes 106, 116 from the CDMA, eHRPD, and LTE network interfaces. A monitoring system, such as monitoring probes 106, 116 and monitoring server 107, may be coupled to interfaces and links in the network to passively monitor and collect signaling data from one or more interfaces in the network. The monitoring system may collect user plane and control plane data from the interfaces. The monitoring probes 106, 116 and monitoring server 107, may comprise, for example, one or more processors running one or more software applications that collect, correlate and analyze Protocol Data Units (PDU) and data packets from the network interfaces and links. Probes 106, 116 and/or monitoring server 107 correlate the information captured on different interfaces and associate it with a particular UE 102. Results of these correlation operations may be presented to a user, for example, via a user interface on workstation 108, which may include a GUI, a command line interface, or the like.

The session records may comprise, for example, data associated with voice calls or data sessions initiated by or received by the UEs 102. The network monitoring system, comprising probes 106, 116 and monitoring server 107, for example, may allow a network service provider to collect data from various sessions concurrently or simultaneously. Data for multiple sessions is stored in database 109, which allows the service provider to track each session or to extract system-wide parameters. Data stored in database 109 may be queried by the service provider, for example, on a per-session, per-user, per-device, or per-protocol basis. The network monitoring system may use the collected information to generate Quality-of-Experience (QoE), Key Quality Indicators (KQIs), and/or Key Performance Indicators (KPIs) for each session and for the overall network. These various metrics may be based, for example, upon how often re-buffering, screen resolution changes, gaps, and/or missing fragments are detected. For instance, excessive buffering during a given session (i.e. re-buffering), numerous screen resolution changes, and gaps in the VoIP stream may lower a user's QoE.

The monitoring system may incorporate protocol analyzer, session analyzer, and/or traffic analyzer functionality that provides OSI (Open Systems Interconnection) layer 2 to layer 7 troubleshooting by characterizing IP traffic by links, nodes, applications and servers on the network. Such functionality is provided, for example, by the GeoProbe G10 platform, including the Iris Analyzer Toolset applications and Spl-probes, from Tektronix Incorporated. Any number of interconnected monitoring system probes may be coupled to one or more interfaces within the network. A single monitoring probe may capture data from a particular interface, or two or more probes may be coupled to one interface.

The monitoring probes 106, 116 may be coupled to network interfaces via packet capture devices, such as high-speed, high-density probes that are optimized to handle high bandwidth IP traffic. Monitoring probes 106, 116 passively capture message traffic from the interfaces without interrupting the network's operation. In an alternative embodiment, monitoring probes 106, 116 may be active components, such as a software agent, that reside on a network node, for example, and that captures data packets passing into or out of the node.

The information that is correlated into a single session record is collected from several different network interfaces by different monitoring probes. It can be difficult to correlate this information and to associate it with a particular UE because no single data field is carried by all messages or PDUs in the CDMA, eHRPD or LTE networks. Moreover, certain data is only available on—or relevant to—one type of network. In order to associate all of the information relevant to a particular UE, a mapper may be used to identify which UE or session record is associated with a newly captured message or PDU.

Existing mappers have highly specific protocol knowledge built into them. For example, an A-interface mapper may depend upon a known International Mobile Subscriber Identity (IMSI)—Temporary Mobile Subscriber Identity (TMSI) relationship; a General Packet Radio Services (GPRS) mapper may depend upon an encryption key-subscriber relationship; and a 3G mapper may depend upon a Packet Temporary Mobile Subscriber Identity (P-TMSI), TMSI-IMSI relationship. Protocol knowledge is built into the existing mappers, which makes it very difficult for a next-generation or new technology mapper to reuse an older mapper for a new protocol.

The architecture for the multiple protocol mapper proposed herein has the following characteristics. The mapper is structured as a generic database that is not be aware of or limited by the underlying protocols. This allows the database to be provided by or used by any third-party open source tool, for example. In one embodiment, the mapper is a fast, high-performance key-value store that provides fast indexing and writing to disk. A generic client library provides an interface to the mapper. These characteristics, a generic database and a generic client library, constitute the mapper framework and do not change irrespective of the protocol or technology used in the network.

Existing, protocol-specific mappers require a specific data structure for each value. In the mapper disclosed herein, the data may use key-value storage without pre-defining an index or the size or structure of the data to be stored. Instead, the multiple protocol mapper, any parameter may be selected as an index or key that can be stored with other information as the data value. The mapper does not require a defined structure and, therefore, any information can be stored in the key-value format.

In one embodiment, any client that wants data persisted or shared, uses the client library, defines a Google protocol buffer (GPB) or other structured data, serializes the data (i.e. the value to be mapped), indexes the data with a key (e.g. a parameter used in one of the network protocols), and sends the key-value pair to the mapper. The need for protocol-specific knowledge is limited to the GPB definition and to deciding when to serialize and send data to the mapper. These steps are the only development work needed when the mapper is extended to cover a new protocol or technology. Instead of GPB, any language-neutral, platform-neutral, extensible mechanism for serializing structured data may be used. This allows the user to define how to structure the data once, and then generate source code to write and read the structured data to and from data streams.

The client does not need to be aware whether the mapper is within monitoring system probe or server or if it is external to the monitoring system. This strategy allows the mapper to be moved out of the monitoring system as needed to serve multiple service providers, networks, or probes.

The mapper described herein may be used as an "all-G" (i.e. 2G, 3G, 4G, etc.) mapper that can be used with any number or type of protocols because the data is stored in a generic, flexible format that is not limited to a particular protocol. Accordingly, the mapper is not restricted to an initial technology but can serve as the framework for any future mappers built for the monitoring system platform.

FIG. 2 illustrates a data model for a CDMA/LTE mapper according to one embodiment. Multi-protocol subscriber record 201 includes data for both an LTE subscriber record 202 and data for a CDMA subscriber record 203. Subscriber record 201 may be used, for example, with a UE that can operate on both a CDMA and LTE network and that may be handed-off between those networks during a session. Accordingly, PDUs for this UE may be captured from both CDMA and LTE networks. Fields from LTE subscriber record 202 and/or CDMA subscriber record 203 can be used to associate these PDUs with the appropriate session record.

LTE subscriber record 202 comprises LTE IMSI 204, LTE decipher record 205, Globally Unique Temporary Identity (GUTI) 206, eNodeB-UE S1AP ID 207, MME-UE S1AP ID 208, Mobile Subscriber Integrated Services Digital Network Number (MSISDN) 209, and Next Hop Key 210.

LTE decipher record 205 may comprise, for example, current evolved Key Set Identifier (eKSI) 211, and one or more LTE authentication information vectors 212. Each LTE authentication information vector 212 comprises NAS uplink count 213, NAS downlink count 214, eKSI 215, security algorithm 216, RAND 217, and Access Security Management Entity key (KASME) 218. For example, the mapper may store the five most recently observed authentication information vectors 212. The most recent vector 212 is used to decipher messages and, if unsuccessful, the message may be deciphered using older key values in vector 212.

CDMA subscriber record 203 comprises LTE IMSI 218, CDMA IMSI 219, and MSISDN 220.

The parameters illustrated in subscriber record 201 may be derived by analyzing packets captured form the interfaces of a CDMA and/or LTE network as disclosed, for example, in pending U.S. patent application Ser. No. 12/974,636 for "Evolved Packet System Non Access Stratum Deciphering using Real-Time LTE Monitoring," filed Dec. 21, 2010; and U.S. patent application Ser. No. 13/114,934 for "Multiple Protocol Correlation and Topology Detection in eHRPD Networks," filed May 24, 2011, the disclosures of which are hereby incorporated by reference herein in their entirety.

The monitoring system gains a number of unique advantages using the data model and mapper illustrated in FIG. 2. The monitoring system may decipher the S1-MME NAS payload continuously even after a down time for the monitoring system, since the deciphering keys are mapped and persisted in database. A UE identifier, such as IMSI, is not available in every message in the network; however, a temporary identifier, such as a GUTI for the UE may be present in the UE related signaling messages. Using the mapper disclosed herein, messages may be associated with a session record using a GUTI-to-IMSI mapping and/or a GUTI-to-MSISDN mapping. This is advantageous because IMSI and MSISDN are populated in every session record even though those values are not seen in the signaling messages for that session record. This helps network operators just use IMSI/MSISDN as filtering in the monitoring system without having to trace through temporary identifiers.

The monitoring system also provides a mapping of a CDMA IMSI to an LTE IMSI in the session records. In one embodiment CDMA UEs are assigned dual IMSIs—both a CDMA IMSI and an LTE IMSI. Some parts of the network will only see or know one IMSI value, but not both. This mapping provides value because network operators do not have to enter two IMSI's for the monitoring system to filter, which would then require the monitoring system to merge the results into a session record. Similarly, the monitoring system provides a CDMA-IMSI-to-MSISDN and LTE-IMSI-to-MSISDN mapping in the session record.

The data model illustrated in FIG. 2 is one embodiment of a multiple protocol mapper. The mapping may be stored in monitoring system storage, such as database 109 (FIG. 1) or in the storage present within the monitoring systems 106, 116.

It will be understood that other structured databases may also be used to store the multiple protocol mapper and that a key-value storage is not the only useful storage option.

FIG. 3 illustrates the use of the mapper in one embodiment. Monitoring probes 301, 302 capture packets from various interfaces and/or from nodes in CDMA/LTE network 303. Each monitoring probe 301, 302 has a cache 304, 305 for storing a subset of the mapper information. Monitoring probes 301, 302 may routinely send mapping information to database 307 for storage and for use by server 306 and other probes. All of the mapping information is stored in database 307, and a subset of "active" mapping information is also maintained in caches 304 and 305 for use by the monitoring probes. The mapper entries stored in cache 304, 305 have typically been created, updated, or queried recently, such as within a predefined period. Once the mapper has aged beyond a predetermined time (i.e., no related packets have been observed for some duration), the mapping information is sent to monitoring server 306 for storage in monitoring database 307.

When a new packet is captured by a monitoring probe 301, for example, the probe extracts parameters, such as an IMSI, from the packet and attempts to match the parameters to existing session records using the mappers. The probe first determines if the parameters are present in the mapper cache 304. If it does not have that parameter in cache 304, then probe 301 queries server 306 and database 307 for a persisted mapper information with that parameter. If the mapping information is found, the data is provided to probe 301 for use in processing the packet, such as deciphering or identifying related session records. If no related mapping information is found, then a new mapping entry is created in cache 303 and persisted to database 307. Additional data is added to the mapper as it is collected from other packets. For example, an IMSI or GUTI may be used to create a mapper entry, then parameters from context messages are added to the mapper entry, and then additional parameters, such as an MSISDN, in other messages are added to the mapper entry as these parameters are observed.

FIG. 4 is a flowchart illustrating the use of the mapper according to one embodiment. In step 401, a monitoring probe receives a packet captured from the LTE/CDMA network. In step 402, the monitoring probe extracts one or more parameters from the packet. In step 403, the monitoring probe determines whether a mapper entry exists in a local cache based upon the extracted parameters. If the parameters match a mapper in the monitoring probe cache, then the process moves to step 406 and the monitoring probe updates a mapper database and local cache using the parameters extracted from the packet.

If a mapper entry does not exist in the local cache, then the process moves to step 404 and the monitoring probe determines whether a mapper entry exists in the database using the parameters extracted from the packet. If the mapper entry does exist in the database for the extracted parameters, then the process moves to step 406 and the monitoring probe updates the mapper database and local cache using the parameters extracted from the packet.

If the mapper entry does not exist in the database in step 404, then the process moves to step 405 and the monitoring probe creates a new mapper entry in the database using the extracted parameters. In step 406, the monitoring probe updates the mapper database and cache using the parameters.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for processing captured network traffic of an overlapping CDMA/LTE network having multiple protocols, the method comprising:

receiving from an external monitoring system, one or more Long Term Evolution (LTE) messages captured from network traffic of a LTE network of an overlapping CDMA/LTE network having multiple protocols, wherein the LTE messages are from a first monitoring probe coupled to the LTE network;

receiving from the external monitoring system, one or more Code Division Multiple Access (CDMA) messages captured from network traffic of a CDMA network of the overlapping CDMA/LTE network, wherein the CDMA messages are from a second monitoring probe coupled to the CDMA network;

identifying a LTE/CDMA mapper associated with the LTE and CDMA messages that were captured, wherein the LTE/CDMA mapper is associated with a user equipment (UE) that is capable of operating on both the LTE and CDMA networks;

processing, at the external monitoring system, the LTE and CDMA messages that were captured using the LTE/CDMA mapper, wherein the LTE/CDMA mapper includes a generic database using a key-value scheme for associating together all information relevant to a session for a particular UE based on the LTE messages and the CDMA messages that were captured by the first and second monitoring probes even if no single data field is carried by all the messages that were captured by selecting a first key based upon a first parameter of the LTE messages that were captured, selecting a second key based upon a second parameter of the CDMA messages that were captured, storing the first and second keys with associated data for each LTE and CDMA message that was captured in the generic database; and associating all of the information related to a session for the UE based upon the first and second keys, so that an external monitoring system using a plurality of monitoring probes can access and process data from the overlapping CDMA/LTE network by associating information relevant to a UE in the overlapping CDMA/LTE network;

serializing a data value and indexing with a key at a plurality of client; and sending from the clients the key-value to the LTE/CDMA mapper, wherein the serializing is performed differently according to a network type.

2. The method of claim 1, wherein processing the LTE and CDMA messages further comprises:
    extracting parameters from the LTE or CDMA messages that were captured; and
    storing the parameters to the LTE/CDMA mapper.

3. The method of claim 1, wherein processing the LTE and CDMA messages further comprises:
    deciphering content in the LTE or CDMA messages that were captured using authentication parameters stored in the LTE/CDMA mapper.

4. The method of claim 1, further comprising:
    determining that no LTE/CDMA mapping information is available in a local cache; and
    retrieving an LTE/CDMA mapping information associated with the LTE and CDMA messages that were captured from a central database.

5. The method of claim 1, further comprising:
    using a generic client library to access the LTE/CDMA mapper.

6. The method of claim 1, further comprising:
    capturing one or more evolved High Rate Packet Data (eHRPD) messages from an eHRPD network; and
    using the LTE/CDMA mapper to process the eHRPD messages that were captured.

7. A system for processing captured network traffic of a network having multiple protocols, the system comprising:
    an all-G multiple protocol mapper having a generic database storing a generic client library for providing an interface to the all-G multiple protocol mapper, wherein: the generic database is configured to store user equipment (UE) data associated with a UE that is capable of operating on both the LTE and CDMA networks, the UE data including data messages that were captured from traffic on the LTE and CDMA networks, using a key-value storage without pre-defining a selection of an index, a size, and a structure of the data so that any parameter can be selected as an index key that is stored with other information as values of the data; and the generic client library receives a definition of structure data, serializes the captured UE data, selects a parameter used in a network protocol as the index key, indexes the captured UE data with the index key selected, and stores a pair consisting of the index key and associated captured UE data in the generic database; and
    a plurality of monitoring probes, each monitoring probe including:
    a processor; and
    a memory coupled to the processor, the memory configured to store program instructions executable by the processor to cause the monitoring probe to:
        capture messages from network traffic of a Long Term Evolution (LTE) network and a Code Division Multiple Access (CDMA) network;
        communicate with the all-G multiple protocol mapper, wherein the all-G multiple protocol mapper is associated with the LTE and CDMA messages that were captured, and wherein the all-G multiple protocol mapper is associated with the UE; and
        process the LTE and CDMA messages that were captured using the all-G multiple protocol mapper so that all UE data that was captured relevant to a particular UE session is identified in the generic database; and
    serialize data values that were captured;
    index the data values that were captured and serialized with a key at a plurality of clients; and
    store the key-value to the LTE/CDMA mapper, wherein the serializing is performed differently according to a network type.

8. The system of claim 7, the program instructions executable by the processor to cause the monitoring probe to:
    extract parameters from the LTE or CDMA messages that were captured; and
    storing the parameters to the LTE/CDMA mapper.

9. The system of claim 8, wherein processing the LTE and CDMA messages that were captured further comprises:
    deciphering content in the LTE or CDMA messages that were captured using authentication parameters stored in the LTE/CDMA mapper.

10. The system of claim 7, the program instructions executable by the processor to cause the monitoring probe to:
    determine that no LTE/CDMA mapping information is available in a local cache; and
    retrieve an LTE/CDMA mapping information associated with the LTE and CDMA messages that were captured from a central database.

11. The system of claim 7, the program instructions executable by the processor to cause the monitoring probe to:
    use a generic client library to access the LTE/CDMA mapper.

12. The system of claim 7, wherein identifying a LTE/CDMA mapper associated with the LTE and CDMA messages that were captured further comprises:
    retrieving an LTE/CDMA mapper created by another monitoring probe from a central database.

13. The system of claim 7, wherein the plurality of monitoring probes are provided by different service providers.

* * * * *